United States Patent
Wang et al.

(10) Patent No.: US 11,886,891 B2
(45) Date of Patent: Jan. 30, 2024

(54) CONTEXT-BASED MULTIEXPERIENCE ELEMENT DYNAMICALLY GENERATED USING NATURAL LANGUAGE PROCESSING

(71) Applicant: SAP SE, Walldorf (DE)

(72) Inventors: Qiu Shi Wang, Singapore (SG); Lin Cao, Singapore (SG)

(73) Assignee: SAP SE, Walldorf (DE)

( * ) Notice: Subject to any disclaimer, the term of this patent is extended or adjusted under 35 U.S.C. 154(b) by 126 days.

(21) Appl. No.: 17/471,328

(22) Filed: Sep. 10, 2021

(65) Prior Publication Data

US 2023/0086778 A1   Mar. 23, 2023

(51) Int. Cl.
| | | |
|---|---|---|
| *G06F 9/451* | (2018.01) | |
| *G06F 3/0481* | (2022.01) | |
| *H04L 51/02* | (2022.01) | |
| *G06F 40/40* | (2020.01) | |

(52) U.S. Cl.
CPC ............ *G06F 9/451* (2018.02); *G06F 3/0481* (2013.01); *G06F 40/40* (2020.01); *H04L 51/02* (2013.01)

(58) Field of Classification Search
CPC ........ G06F 3/0481; G06F 9/451; G06F 40/40; H04L 51/02
See application file for complete search history.

(56) References Cited

U.S. PATENT DOCUMENTS

| | | | |
|---|---|---|---|
| 7,039,875 B2 * | 5/2006 | Khalfay | .................... G06F 8/30 715/744 |
| 8,751,491 B2 * | 6/2014 | Fitzmaurice | .......... G06F 3/0237 707/727 |
| 9,274,784 B2 | 3/2016 | Wang et al. | |
| 9,348,579 B2 | 5/2016 | Xia et al. | |
| 9,442,745 B2 | 9/2016 | Xia et al. | |
| 9,552,404 B2 | 1/2017 | Zang et al. | |
| 9,678,955 B2 | 6/2017 | Yao et al. | |
| 9,794,329 B2 | 10/2017 | Chen et al. | |
| 9,952,835 B2 | 4/2018 | Wang et al. | |
| 10,095,509 B2 | 10/2018 | Xia et al. | |
| 10,338,907 B2 | 7/2019 | Zhou et al. | |

(Continued)

OTHER PUBLICATIONS

U.S. Appl. No. 16/928,098, filed Jul. 14, 2020, Wang et al.

(Continued)

*Primary Examiner* — Eric J. Bycer
(74) *Attorney, Agent, or Firm* — Fish & Richardson P.C.

(57) ABSTRACT

Methods, systems, and computer-readable storage media for receiving initial input from a user of the application, the initial input indicating that a UI element is to be generated for the user, receiving context data representative of a context of the application when the input is received, the context data at least partially including a data schema definition of data accessed by the application, prompting the user for input at least partially based on the context data, receiving additional input responsive to the prompting, defining dynamic metadata based on at least a portion of the initial input, at least a portion of the additional input, and at least a portion of the data schema definition, the dynamic metadata including one or more actions that can be executed on data accessed through the UI element, and processing the dynamic metadata to generate the UI element for display in the application.

20 Claims, 6 Drawing Sheets

(56) References Cited

U.S. PATENT DOCUMENTS

| | | |
|---|---|---|
| 10,365,922 B1 | 7/2019 | Wang et al. |
| 10,521,196 B1 | 12/2019 | Wang et al. |
| 2007/0143662 A1* | 6/2007 | Carlson .................. G06F 9/451 |
| | | 715/234 |
| 2007/0188796 A1* | 8/2007 | Saito .................. G06F 11/0733 |
| | | 358/1.15 |
| 2011/0167408 A1* | 7/2011 | Harmon .................. G06F 9/451 |
| | | 717/121 |
| 2012/0215543 A1* | 8/2012 | Oz ............................ G06F 8/38 |
| | | 704/E15.001 |
| 2015/0082298 A1 | 3/2015 | Wang et al. |
| 2015/0089403 A1 | 3/2015 | Zhu et al. |
| 2015/0113499 A1* | 4/2015 | Sharma ..................... G06F 8/20 |
| | | 717/104 |
| 2016/0004529 A1 | 1/2016 | Xia et al. |
| 2017/0308595 A1* | 10/2017 | Dey ...................... G06F 16/283 |
| 2018/0183891 A1* | 6/2018 | Zhang .................. H04L 67/125 |
| 2019/0034172 A1* | 1/2019 | Kostello ................... G06F 8/20 |
| 2020/0125586 A1* | 4/2020 | Rezaeian ................ G06F 3/048 |
| 2020/0380432 A1 | 12/2020 | Wang et al. |
| 2021/0042338 A1* | 2/2021 | Smutko ............... G06F 11/3438 |
| 2021/0064984 A1 | 3/2021 | Wang et al. |
| 2021/0081227 A1* | 3/2021 | Verma ...................... G06N 5/01 |
| 2022/0197952 A1* | 6/2022 | Hennig .................. H04L 51/02 |

OTHER PUBLICATIONS

SAP.com "SAP Fiori Elements" Jan. 2019, [retrieved on Sep. 9, 2021], retrieved from : URL <https://experience.sap.com/fiori-design-web/smart-templates/>, 8 pages.

U.S. Appl. No. 17/646,890, filed Jan. 4, 2022, Wang et al.

* cited by examiner

FIG. 4A

Work Orders — 400
Back | Filter | +

Item Search

Work Orders — 400
Cancel | Filter | Done — 402

By: OrderId | OrderType | BusinessArea

Filter
By Rule (BusinessArea): 9900

By Priority: Low | 9900

CONTEXT-BASED MULTIEXPERIENCE ELEMENT DYNAMICALLY GENERATED USING NATURAL LANGUAGE PROCESSING

BACKGROUND

Users interact with computer-executed applications to perform a multitude of tasks. For example, in an enterprise setting, users can interact with one or more of an enterprise resource planning (ERP) application, a customer relationship management (CRM) application, and a human capital management (HCM) application to perform tasks in support of operations of an enterprise. To facilitate these interactions, applications are programmed with user interfaces (UIs), which can also be referred to as UI elements. Users interact with the application by providing input to and receiving output from UI elements. Example UI elements can include object pages, list pages, and analytics pages.

Traditionally, types, visual representative effects, data sources, data query options, and data bindings of a UI element are statically defined during development of the application. For example, during design-time, a developer manually generates code to define one or more UI elements that are to be provided with the application. During run-time of the application, users can interact with the application through this pre-defined set of UI elements (i.e., the UI elements delivered with the application). Consequently, applications tend to be generalized to the needs of a typical user and might not include UI elements for individual users. Further, any tailoring of UI elements has to occur during design-time as part of a development cycle.

SUMMARY

Implementations of the present disclosure are directed to providing user-specific user interface (UI) elements. More particularly, implementations of the present disclosure are directed to dynamically generating UI elements with multi-experience in different environments, the UI elements being generated based on application context and metadata resulting from natural language processing (NLP).

In some implementations, actions include receiving, by a metadata generator, initial input from a user of the application, the initial input indicating that a UI element is to be generated for the user, receiving, by the metadata generator, context data representative of a context of the application when the input is received, the context data at least partially including a data schema definition of data accessed by the application, prompting, by the application, the user for input at least partially based on the context data, receiving, by the metadata generator, additional input responsive to the prompting, defining, by the metadata generator, dynamic metadata based on at least a portion of the initial input, at least a portion of the additional input, and at least a portion of the data schema definition, the dynamic metadata including one or more actions that can be executed on data accessed through the UI element, and processing, by a UI generator, the dynamic metadata to generate the UI element for display in the application. Other implementations of this aspect include corresponding systems, apparatus, and computer programs, configured to perform the actions of the methods, encoded on computer storage devices.

These and other implementations can each optionally include one or more of the following features: the initial input indicates a type of the UI element; the additional input indicates at least one action of the one or more actions; the application includes a chat bot that functions as a channel for receiving the initial input and the additional input from the user and for prompting the user; the initial input and the additional input are processing using one or more NPL techniques to determine metadata that is to be included in the dynamic metadata; the one or more actions include a sort action, a filter action, a navigation action, and a search action; and the UI element includes one or a list page, an object page, and an analytics page.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIGS. 4A and 4B depict an example UI element generated in accordance with implementations of the present disclosure.

Like reference symbols in the various drawings indicate like elements.

DETAILED DESCRIPTION

Figure 1:
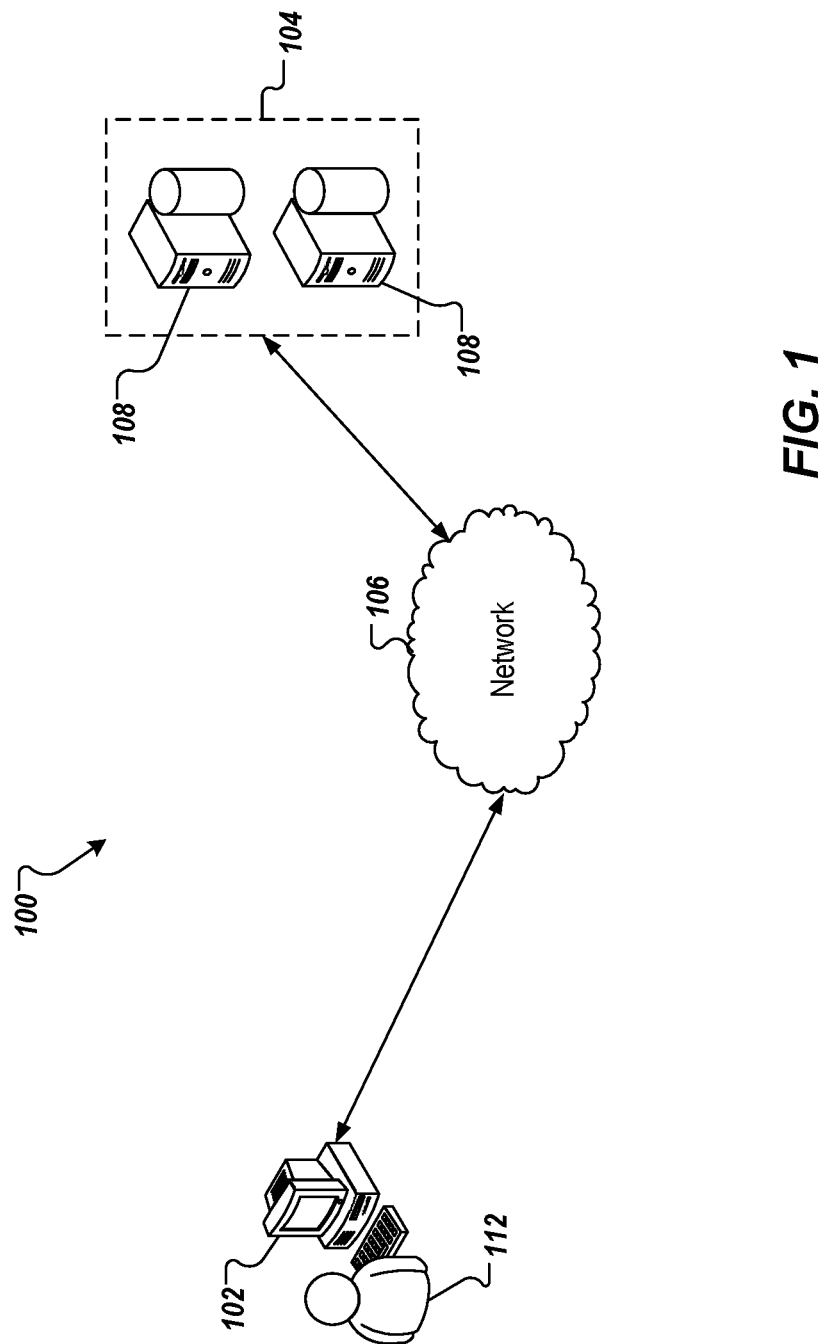
FIG. 1 depicts an example architecture that can be used to execute implementations of the present disclosure.

Implementations of the present disclosure are directed to providing user-specific user interface (UI) elements. More particularly, implementations of the present disclosure are directed to dynamically generating UI elements with multi-experience in different environments, the UI elements being generated based on application context and metadata resulting from natural language processing (NLP).

Implementations can include actions of receiving, by a metadata generator, initial input from a user of the application, the initial input indicating that a UI element is to be generated for the user, receiving, by the metadata generator, context data representative of a context of the application when the input is received, the context data at least partially including a data schema definition of data accessed by the application, prompting, by the application, the user for input at least partially based on the context data, receiving, by the metadata generator, additional input responsive to the prompting, defining, by the metadata generator, dynamic metadata based on at least a portion of the initial input, at least a portion of the additional input, and at least a portion of the data schema definition, the dynamic metadata including one or more actions that can be executed on data accessed through the UI element, and processing, by a UI generator, the dynamic metadata to generate the UI element for display in the application.

To provide further context for implementations of the present disclosure, and as introduced above, users interact with computer-executed applications to perform a multitude of tasks. For example, in an enterprise setting, users can interact with one or more of an enterprise resource planning (ERP) application, a customer relationship management (CRM) application, and a human capital management (HCM) application to perform tasks in support of operations of an enterprise. To facilitate these interactions, applications are programmed with user interfaces (UIs), which can also be referred to as UI elements. Users interact with the application by providing input to and receiving output from UI elements. Example UI elements can include object pages, list pages, and analytics pages.

Traditionally, types, visual representative effects, data sources, data query options, and data bindings of a UI element are statically defined during development of the application. For example, during design-time, a developer manually generates code to define one or more UI elements that are to be provided with the application. During run-time of the application, users can interact with the application through this pre-defined and limited set of UI elements (i.e., the UI elements delivered with the application). Consequently, applications tend to be generalized to the needs of a typical user and might not include UI elements for individual users. Further, any tailoring of UI elements has to occur during design-time as part of a development cycle. This can limit user ability to efficiently interact with the applications to perform tasks.

In view of the above context, implementations of the present disclosure provide for dynamic generation of one or more UI elements with multi-experience in different environments (e.g., different computing devices and/or operating systems). As described in further detail herein, the UI elements are generated based on application context and metadata resulting from NLP. More particularly, implementations of the present disclosure provide a metadata generator that leverages machine learning (ML) models, such as NLP and a multi-experience (MX) UI generator to generate UI elements in various user environments. In some examples, the metadata generator includes a set of ML models, which accommodate different NLP tasks. Example NLP tasks include, without limitation, speech segmentation, word segmentation, semantic parsing, and terminology extraction. In some examples, the metadata generator receives voice input of a user through a conversational UI and receives context data representative of a context of an application. Example context data can include, without limitation, UI controls, data of a current page, and page layout. The metadata generator processes the voice input and the context data to generate metadata that represents a set of definitions of the UI element(s). The MX UI generator parses the metadata to resolve type(s) of the UI element(s), visual representative effect, data source, data query option, and data binding, and render the UI element in various user environments.

Implementations of the present disclosure provide one or more advantages. For example, implementations of the present disclosure enable no-code development of UI elements at runtime. That is, user input is collected in real-time through voice input and is processed using the NLP models to extract definitions and specifications for the UI element(s). Here, no code refers to the absence of a dedicated developer to manually code UI elements, which would then be tested and deployed over a development cycle (e.g., days, weeks). In some examples, pre-generated static metadata is combined with metadata generated based on user input at tun-time to enable rapid development of the UI element(s) in real-time. As another example, implementations of the present disclosure enable context-based dynamic development of UI elements with scenario awareness. For example, the UI elements are dynamically generated based on semantic and structural data contexts, scenario annotations, and real-time user input. As used herein, real-time may describe one or more operations that are performed without any intentional delay, taking into account the processing, and/or communication limitations of the computing system(s) performing the operation(s) and the time needed to initiate, and/or perform the operation(s).

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106). In some examples, the server system 104 can provision a cloud platform that hosts one or more services (e.g., ML services, application services, data services).

In accordance with implementations of the present disclosure, an application is provided that includes a metadata generator and a MX UI generator to provide one or more UI elements in real-time in response to user input. For example, the application can be executed by the client device 102 to generate UI elements based on input provided by the user 112. In this manner, the UI elements are specific to the user 112. In some examples, the application is a web-based application. In some examples, the application is a mobile application. As described in further detail herein, the UI elements are generated in real-time based on the user input, static metadata, and application context, and are responsive to a scenario that the user 112 is operating in. Further, the UI elements are generated to conform with the client device 102 (e.g., tablet, smartphone, computer) that the user 112 interacts with the application through. In this manner, the UI elements are provided as MX UI elements (e.g., MX referring to various devices).

Figure 2:
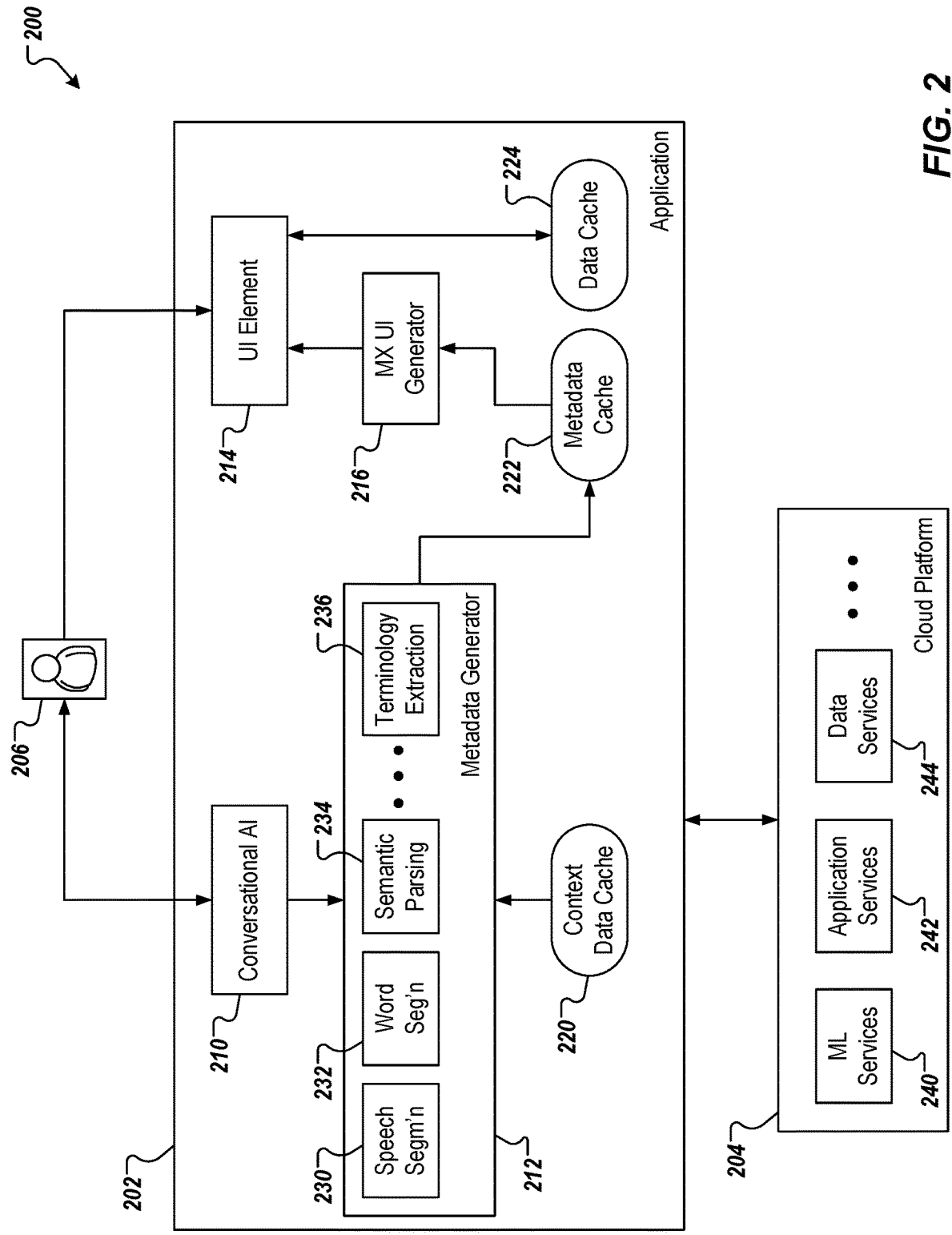
FIG. 2 depicts an example architecture in accordance with implementations of the present disclosure.

FIG. 2 depicts an example architecture 200 in accordance with implementations of the present disclosure. The example architecture 200 includes an application 202, a cloud platform 204, and a user 206. As described in further detail herein, the user 206 interacts with the application 202, which provides one or more UI elements that are specific to the user 206.

In the example of FIG. 2, the application 202 includes a conversational artificial intelligence (AI) module 210, a metadata generator 212, a UI element 214, and a MX UI generator 216. The application 202 includes a context data cache 220, a metadata cache 222, and a data cache 224. The metadata generator 212 includes, among other possible modules, a speech segmentation module 230, a word segmentation module 232, a semantic parsing module 234, and a terminology extraction module 236. The cloud platform 204 hosts, among other possible services, ML services 240, application services 242, and data services 244.

In further detail, during development of the application 202 (i.e., design-time), static metadata is provided to define the overall structure and workflow of the application 202. For example, a developer can develop the application 202 using a development environment (e.g., a web-based application studio), through which the static metadata is defined. An example development environment includes, without limitation, SAP Fiori Elements™ (provided by SAP SE of Walldorf, Germany), which provides a UI generation framework that uses metadata annotations and predefined templates to generate applications (e.g., the application 202). In some examples, the static metadata is deployed to the application services 242 hosted in the cloud platform 204. During application runtime, the static metadata is retrieved from the application services 242 and is stored in a metadata cache on one or more devices (e.g., the client device 102 of FIG. 1). The UI elements of the application 202 are constructed and executed from the static metadata. In this manner, the user 206 can interact with the application 202 through the UI elements to perform one or more tasks.

During the interaction between the user 206 and the application 202, implementations of the present disclosure enable the user 206 to prompt generation of one or more UI elements. An example UI element includes a page presented by the application 202. Example pages include, without limitation, an object page, a list page, and an analytics page. In some examples, a page can include a header area with built-in actions and a body area with a flexible column layout with built-in functionalities (e.g., search, filter, sort, group).

In some examples, the user 206 may prefer to have available a UI element that is not already provided by the application 202. For example, the user 206 may be interacting with a data set (e.g., an entity set) and can decide that a UI element for exploring the data set is desired. As described in further detail herein, the user 206 triggers generation of a UI element and provides input that is descriptive of the UI element. In response, the application 202 generates the UI element in real-time.

In further detail, the user 206 can provide textual input and/or verbal input to prompt the application 202 to generate the UI element. Implementations of the present disclosure are described in further detail with reference to verbal input, but it is contemplated that implementations of the present disclosure can be realized using any appropriate input (e.g., textual input). With regard to verbal input, speech of the user 206 can be captured through a microphone and can be recorded as speech data. In some examples, the user 206 prompts the application 202 through the conversation AI module 210, which receives the speech data. For example, the conversational AI module 210 (e.g., providing a chat bot) can be activated by the user 206 and the user 206 can chat with the chat bot to input requirements for the UI element that is to be generated. For example, the speech data can be converted to text data (e.g., using speech-to-text functionality) and the text data is processed by modules of the metadata generator 212. For example, the speech segmentation module 230 can process the input to segment the input (e.g., into individual sentences), the word segmentation module 232 can process the input to segment words (e.g., within individual sentences), the semantic parsing module 234 can parse the input for semantics, and the terminology extraction module 236 can extract terms from the input. Collectively, the speech segmentation module 230, the word segmentation module 232, the semantic parsing module 234, and the terminology extraction module 236 execute NLP functionality. Word segmentation divides a string of written language (text data provided from the speech data) into its component words. Semantic parsing converts the smallest unit of speech in a natural language to a logical form. Terminology extraction includes automatic identification of keywords and terms. These can be collectively output by the metadata generator 212 as at least a portion of the dynamic metadata.

As described in further detail, besides the input from the user, a context of the application can be determined. In some examples, the context includes a data (e.g., provided as an entity set) that the user 206 is interacting with in the application 202. For example, before requesting a UI element, the user 206 can perform one or more tasks that result in data being retrieved (e.g., from the data services 244). In some examples, the data is associated with a data schema definition (e.g., provide in the Common Schema Definition Language (CSDL)) that provides a list of properties of the data and, for each property, a data type (e.g., string, time, date). In some examples, the schema definition also provides custom annotations, if any, and relationships with other data, if any).

The user input and the context data are processed by the metadata generator 212 to provide dynamic metadata stored in the metadata cache 222. As described in further detail herein, the dynamic metadata includes definitions and specifications for the UI element that is to be generated. The dynamic metadata is integrated into the static metadata in the metadata cache 222. The MX UI generator 216 uses the dynamic metadata to provide the UI element 214. In some examples, the dynamic metadata is provided in JavaScript Object Notation (JSON) format, which contains objects as an unordered set of name/value pairs, and an array an ordered collection of values. Objects and arrays are hierarchically organized in a JSON file. In the dynamic metadata of the present disclosure, every UI control, either a simple control (e.g., a button) or a composite control (e.g., hierarchy of multiple controls) is defined as a JSON object. The MX UI generator 216 parses the metadata file, retrieves the JSON object, gets the definition of each control, and calls respective operating system APIs to render the control on different runtime environments to get the native user interface and experience (i.e., device-specific).

To illustrate implementations of the present disclosure, a non-limiting example is described. In this example, the user 206 is interacting with the application 202 and is working with a work order entity set MyWorkOrders. The following non-limiting example interaction can occur:

User: Hey application, I want to have a page to list all of my current work orders.
    Bot: Do you want to order the list by OrderID?
    User: Yes.
    Bot: It seems that you have a long list of work orders. Do you want to add an action bar to the page to filter them?
    User: Yeah sure! Go ahead.
    Bot: Here you go, your page is ready.

In some examples, the phrase "Hey application" functions as a so-called hot word that prompts the conversation AI 210 to take in verbal input. Through the conversation, the metadata generator 212 is able to extract the definitions and specifications of the UI element that is to be generated. For example, the input can be processed to identify terms, such as "page," "list," and "work orders."

In this example, the data schema definition for the entity set MyWorkOrders (the current context of the application 202), an example of which is discussed in further detail herein, can be retrieved and can be used to prompt questions. For example, the data schema definition can indicate that a property reference OrderId is a key that uniquely identifies the entities of the entity set. Consequently, the conversation AI 210 can be prompted to ask the user about ordering the list by order identifier, as provided in the above example. For example, in the data schema definition for the entity set MyWorkOrders, there are many properties (e.g., OrderId, OrderType, OrderDescription), each being an option as a property to ask the user to choose to use as query options. In some implementations, the key property of the current entity set is selected and is provided as the bot question to ask the user whether they want to use it as a query option. In the above example, OrderID is the key property of the MyWorkOrders entity set. If the user confirms to use OrderID, it is processed as the query option. Otherwise, if the user answers no, the user can be requested to identify a property that is to be used as the query option.

In accordance with implementations of the present disclosure, context data is retrieved from the context data cache 220 and is representative of a current context of the application 202. More particularly, the context data can indicate a current page (UI element) that the application 202 is displaying and that the user 206 is interacting with. Continuing with the example conversation above, the context data can indicate that the user 206 is interacting with a page of the application 202 that is related to a work orders entity set. In some examples, the context data is provided to the application 202 (e.g., for storage in the context data cache 220) from an entity set MyWorkOrders of a backend service hosted on the cloud platform 204 (e.g., an Open Data Protocol (OData) entity set). For example:

"Target": {
"EntitySet": "MyWorkOrders",
"Service": "/Services/Amw.service",
"QueryOptions": "$orderby=OrderId"
Listing 1: Example Context Data (Entity Set)}, In some implementations, the data schema definition (e.g., OData schema definition) of the data entity set can be retrieved by the application 202 as context data. In some examples, the data schema definition provides a list of properties, custom annotations (if any), and relationships between data entities (if any). Continuing with the example of Listing 1, the following example data schema definition can be provided for the MyWorkOrders data entity set:

---

```
<EntityType Name="MyWorkOrder" sap:content-version="1">
  <Key>
    <PropertyRef Name="OrderId"/>
  </ Key>
  <Property Name="OrderShortDescription" Type="Edm.String"
Nullable="false" MaxLength="20" sap:label="
Short Description" sap:creatable="false" sap:updatable="false"
sap:sortable="false" sap:filterable="false"/>
  <Property Name="OrderDescription" Type="Edm.String"
Nullable="false" MaxLength="40" sap:label="Description"
sap:creatable="false" sap:updatable="false" sap:sortable="false"
sap:filterable="false"/>
  <Property Name="OrderType" Type="Edm.String"
Nullable="false" MaxLength="4" sap:label="Order Type"
sap:creatable="false" sap:updatable="false"
sap:sortable="false"/>
  <Property Name="OrderId" Type="Edm.String" Nullable="false"
MaxLength="12" sap:label="Order" sap:creatable="false"
sap:updatable="false" sap:sortable="false"/>
  <Property Name="OrderCurrency" Type="Edm.String"
Nullable="false" MaxLength="5" sap:label="Currency"
sap:creatable="false" sap:updatable="false" sap:sortable="false"
sap:filterable="false" sap:semantics="currency-code"/>
  <Property Name="BusinessArea" Type="Edm.String"
Nullable="false" MaxLength="4" sap:label="Business Area"
sap:creatable="false" sap:updatable="false" sap:sortable="false"
sap:filterable="false"/>
  <Property Name="ControllingArea" Type="Edm.String"
Nullable="false" MaxLength="4" sap:label="CO Area"
sap:creatable="false" sap:updatable="false"
sap:sortable="false"/>
  <Property Name="PlanningPlant" Type="Edm.String"
Nullable="false" MaxLength="4" sap:label="Planning Plant"
sap:creatable="false" sap:updatable="false"
sap:sortable="false"/>
  <Property Name="CreationTime" Type="Edm.Time"
Nullable="false" Precision="0" sap:label="Time created"
sap:creatable="false" sap:updatable="false" sap:sortable="false"
sap:filterable="false"/>
  <Property Name="HeaderEquipment" Type="Edm.String"
MaxLength="18" sap:label="Equipment" sap:creatable="false"
sap:updatable="false" sap:sortable="false"
sap:filterable="false"/>
  <Property Name="HeaderFunctionLocation" Type="Edm.String"
MaxLength="40" sap:label="Functional loc. " sap:creatable="false"
sap:updatable="false" sap:sortable="false"
sap:filterable="false"/>
  <Property Name="LastChangeTime" Type="Edm.DateTime"
Precision="0" sap:label="Time Stamp" sap:creatable="false"
sap:updatable="false" sap:sortable="false"
sap:filterable="false"/>
  <Property Name="MainWorkCenter" Type="Edm.String"
Nullable="false" MaxLength="8" sap:label="Main WorkCtr"
sap:creatable="false" sap:updatable="false" sap:sortable="false"
sap:filterable="false"/>
  <Property Name="Priority" Type="Edm.String"
Nullable="false" MaxLength="1" sap:label="Priority"
sap:creatable="false" sap:updatable="false"
sap:sortable="false"/>
  <Property Name="MainWorkCenterPlant" Type="Edm.String"
Nullable="false" MaxLength="4" sap:label="Plnt WorkCenter"
sap:creatable="false" sap:updatable="false" sap:sortable="false"
sap:filterable="false"/>
```

-continued

```
<Property Name="MaintenanceActivityType" Type="Edm.String"
Nullable="false" MaxLength="3" sap:label="MaintActivType"
sap:creatable="false" sap:updatable="false"
sap:sortable="false"/>
<Property Name="MaintenancePlant" Type="Edm.String"
Nullable="false" MaxLength="4" sap:label="Plant"
sap:creatable="false" sap:updatable="false"
sap:sortable="false"/>
<Property Name="ObjectKey" Type="Edm.String"
Nullable="false" MaxLength="100" sap:label="ObjKey for MobileSta"
sap:creatable="false" sap:updatable="false" sap:sortable="false"
sap:filterable="false"/>
<Property Name="ObjectType" Type="Edm.String"
Nullable="false" MaxLength="3" sap:label="Object Category"
sap:creatable="false" sap:updatable="false" sap:sortable="false"
sap:filterable="false"/>
<Property Name="OrderCategory" Type="Edm.String"
Nullable="false" MaxLength="2" sap:label="Order category"
sap:creatable="false" sap:updatable="false"
sap:sortable="false"/>
<Property Name="CreationDate" Type="Edm.DateTime"
Precision="0" sap:label="Created on" sap:creatable="false"
sap:updatable="false" sap:sortable="false"
sap:filterable="false"/>
<Property Name="RequestStartDate" Type="Edm.DateTime"
Precision="0" sap:label="Bas.Start Date" sap:creatable="false"
sap:updatable="false" sap:sortable="false"
sap:filterable="false"/>
<Property Name="DueDate" Type="Edm.DateTime" Precision="0"
sap:label="Basic fin. date" sap:creatable="false"
sap:updatable="false" sap:sortable="false"
sap:filterable="false"/>
<Property Name="NotificationNumber" Type="Edm.String"
Nullable="false" MaxLength="12" sap:label="Notification"
sap:creatable="false" sap:updatable="false" sap:sortable="false"
sap:filterable="false"/>
<Property Name="PriorityType" Type="Edm.String"
Nullable="false" MaxLength="2" sap:label="PriorityType"
sap:creatable="false" sap:updatable="false" sap:sortable="false"
sap:filterable="false"/>
<NavigationProperty Name="Operations"
Relationship="sap_mobile.MyWOHeader_MyWOOperation"
FromRole="FromRole_MyWOHeader_MyWOOperation"
ToRole="ToRole_MyWOHeader_MyWOOperation"/>
<NavigationProperty Name="Equipment"
Relationship="sap_mobile.Equipment_MyWOHeader"
FromRole="ToRole_Equipment_MyWOHeader"
ToRole="FromRole_Equipment_MyWOHeader"/>
<NavigationProperty Name="WODMSDocuments"
Relationship="sap_mobile.MyWOHeader_DMSDocument"
FromRole="FromRole_MyWOHeader_DMSDocument"
ToRole="ToRole_MyWOHeader_DMSDocument"/>
</EntityType>
```

Listing 2: Example Context Data (Data Schema Definition) In the example of Listing 2, a list of properties within the MyWorkOrder entity set is provided with respective data types (e.g., Type="Edm.String"), custom annotations (e.g., sap:label="Order Type" sap:creatable="false" sap:updatable="false" sap: sortable=" false"), and relationships between the entity type and other entity types. For example, an entity instance of MyWorkOrder can be related to many entity instances of operation<NavigationProperty Name=" Operations" Relationship="sap mobile.MyWOHeader MyWOOperation.

Based on the input and the context data, the following example specifications for the UI element can be provided:
"PageType": "ListPage",
"QueryOptions": "Sorderby=OrderId",
"ActionBar": true,
"Filter": true In some examples, depending on the UI element type that is to be generated, the metadata generator 216 collects specifications. In the above example, the QueryOption, ActionBar, and Filter are mandatory. In another example, such as an analytics page, a chart type and data series are mandatory. A series of questions can be posed to the user to define these specifications. It can be customized to cater for different scenarios, after all of the mandatory specifications are defined, and received confirmation from the user, the dynamic metadata is generated (e.g., in JSON format).

Together with the semantic and structural context data of the application, annotations of the data, and the like, the definitions and specifications of the UI element are processed by ML models and programming logic to generate dynamic metadata for the UI element. The dynamic metadata is stored in the metadata cache 222. The following example dynamic metadata can be provided based on the above example conversation:

```
{
  "Caption": "Work Orders",
  "ActionBar": {
    "Items": [
      {
        "OnPress": "/Actions/Navigation/WorkOrder/
NavigateToCreateWorkOrder.action",
        "Position": "right",
        "SystemItem": "Add"
      },
      {
        "OnPress": "/MDKDevApp/Actions/Filter/Filter.action",
        "Position": "left",
        "Caption": "Filter"
      }
    ]
  },
  "Controls": [
    {
      "Sections": [
        {
          "ObjectCell": {
            "AccessoryType": "disclosureIndicator",
            "Description": "{OrderDescription}",
            "DetailImage": "/MDKDevApp/Images/workorder.png",
            "DetailImageIsCircular": false,
            "Icons": [
              "/MDKDevApp/Images/icon_severity_medium.png",
              "/MDKDevApp/Images/open.png"
            ],
            "OnPress": "/Actions/Navigation/
NavActionToWorkOrderDetail.action",
            "StatusImage":" /MDKDevApp/Images/
workorder_details.png",
            "Title": "{OrderId}"
          },
          "Search": {
            "Enabled": true,
            "Placeholder": "Item Search",
            "BarcodeScanner": true,
            "Delay": 500,
            "MinimumCharacterThreshold": 3
          },
          "Target": {
            "EntitySet": "MyWorkOrders",
            "Service": "/Services/Amw.service",
            "QueryOptions": "$orderby=OrderId"
          } ,
          "_Type": "Section.Type.ObjectTable"
        }
      ],
      "_Type": "Control.Type.SectionedTable",
      "_Name": "SectionedTable"
    }
  ],
  "PullDown": {
    "OnPulledDown":"/MDKDevApp/Rules/PullDownToSearch.js"
  } ,
  "_Type": "ListPage",
  "_Name": "ListPage"
}
```

Listing 3: Example Dynamic Metadata for Work Orders Page The example of Listing 3 defines the UI element as a page for a list of work orders from the MyWorkOrders entity set, ordered by OrderID, together with a search functionality. The page also includes an action bar for filtering and creating work order actions.

In some examples, the MX UI generator 216 generates the UI element (page) for the specific type of device by making a call to a system API to do a platform specific check to get the runtime environment version, device form factors, and the like. The MX UI generator 216 makes a call to a respective UI API of the runtime environment to render the control on different runtime environments to get the native user interface and experience. For example, a button specified in the metadata, after it parsed, it will be rendered by calling UIButton in iOS™ UIKit when running on iOS™, while it will be rendered by calling android.widget.Button when running on Android™.

Figure 3B:
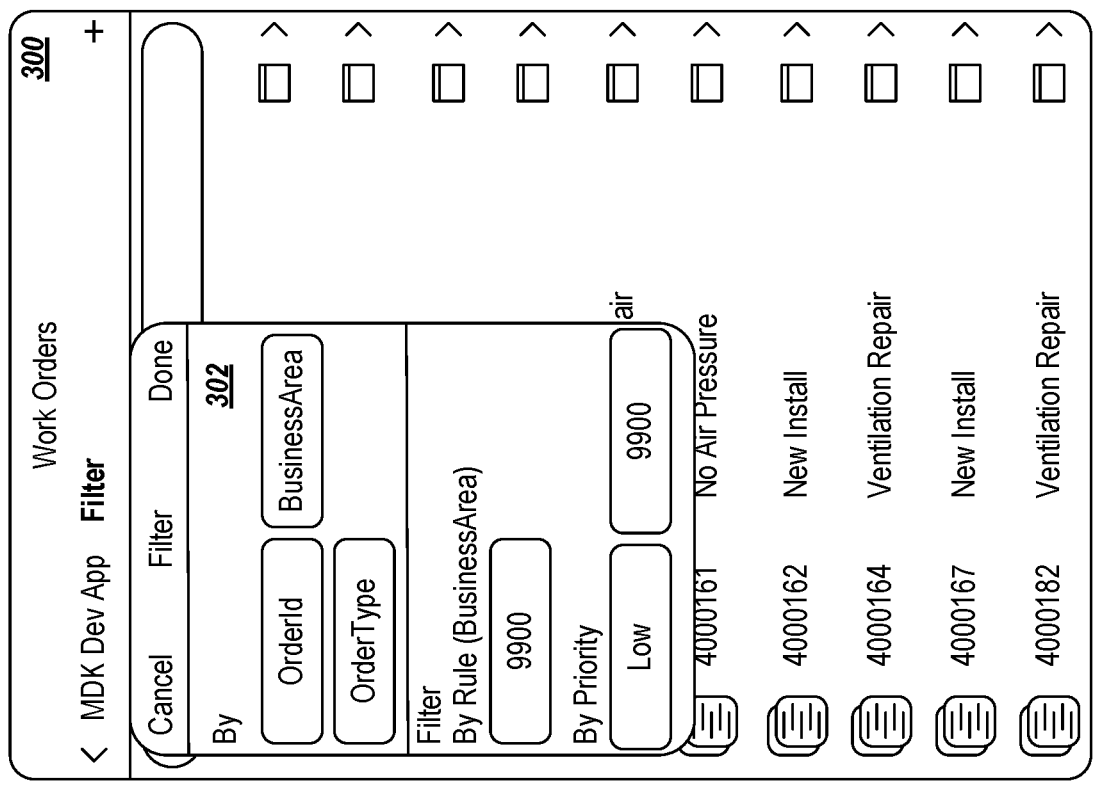
FIGS. 3A and 3B depict an example user interface (UI) element generated in accordance with implementations of the present disclosure.
Figure 3A:
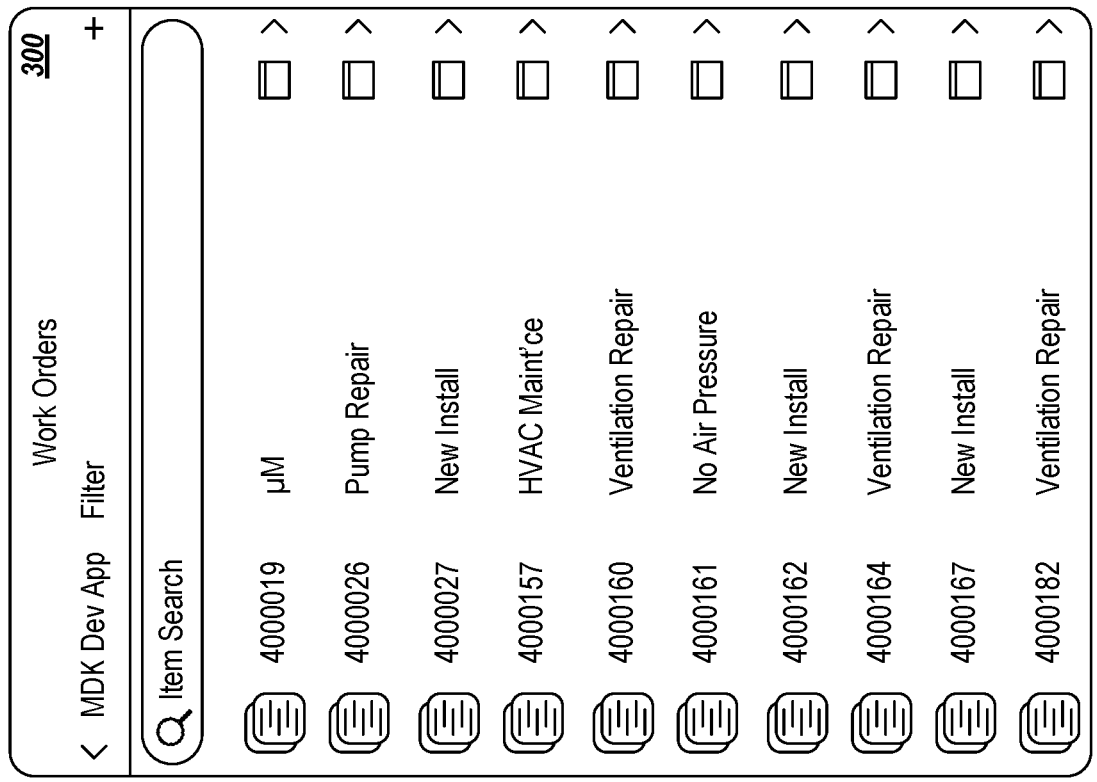

FIGS. 3A and 3B depict an example UI element 300 generated in accordance with implementations of the present disclosure. The example UI element 300 is a page that is generated by the MX UI generator 216 for display on, for example, a tablet computing device, based on the dynamic metadata of Listing 3. FIG. 3B depicts a pop-up filter window 302 that enables a user to select parameters for filtering the work orders.

FIGS. 4A and 4B depict an example UI element 400 generated in accordance with implementations of the present disclosure. The example UI element 400 is a page that is generated by the MX UI generator 216 for display on, for example, a smartphone, based on the dynamic metadata of Listing 3. FIG. 4B depicts a filter page 402 that enables a user to select parameters for filtering the work orders.

Figure 5:
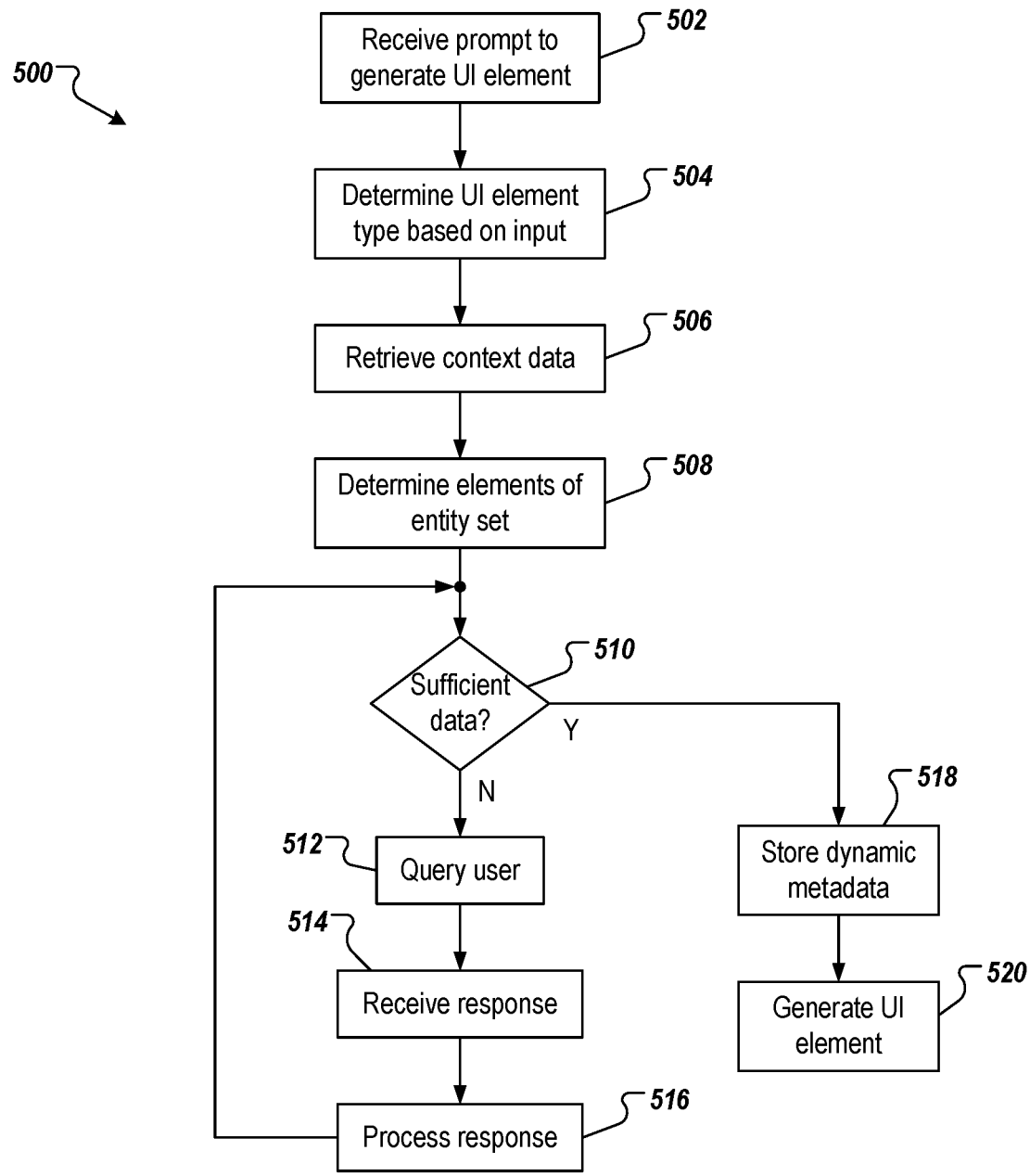
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A prompt is received to generate a UI element (502). For example, and as described herein, a user may be interacting with a data set (e.g., an entity set) and can decide that a UI element for exploring the data set is desired. The user triggers generation of a UI element and provides input that is descriptive of the UI element. For example, the user makes a request to a bot, such as "Hey application, I want to have a page to list all of my current work orders." A type of the UI element is determined (504). For example, and as described herein, the user input can be processed using a set of NLP techniques (e.g., speech segmentation, word segmentation, semantic parsing, terminology extraction) and the type of the UI element is determined from the user input. Continuing with the example above, it can be determined that the user would like a list page from the terms "want," "page," and "list" provided in the example user input. Consequently, it can be determined that the "PageType ": "ListPage" specification is to be used for the UI element.

Context data is retrieved (506). For example, and as described herein, context data is retrieved from a context data cache and is representative of a current context of the application. For example, the context data can indicate a current page (UI element) that the application is displaying and that the user is interacting with. Continuing with the example conversation above, the context data can indicate that the user is interacting with a page of the application that is related to a work orders entity set. Elements of an entity set are determined (508). For example, an entity set can be determined from the context data and/or from user input.

Continuing with the example above, the terms "my," "work," and "orders" can be provided from the user input and can be used to identify the MyWorkOrders entity set, which can be retrieved and elements therein determined (e.g., as depicted in Listing 3).

It is determined whether there is sufficient data to generate the UI element (510). For example, and as described herein, a specification is provided for the type of UI element, the specification indicating data that is required for the type of UI element. Continuing with the example above, a specification for the UI element "PageType": "ListPage" can be provided as "QueryOpt ions ", "ActionBar", and "Filter". If any specification is absent a value, it is determined that there is insufficient data. If there is not sufficient data, the user is queried (512). For example, the user can be queried by the bot to elicit a response regarding one or more specifications of the UI element that are absent a value. Continuing with the example above, the user is queried with "Do you want to order the list by OrderID?" where OrderID is selected, because it is the key property of the MyWorkOrders entity set.

A response is received (514) and the response is processed (516). For example, a specification of the UI element can be populated based on the response. Continuing with the example, the user can respond "Yes" to the question "Do you want to order the list by OrderID?" Consequently, "QueryOpt ions" can be populated with "$orderby=OrderId". This process can continue until all specifications of the UI element are populated with values.

If there is sufficient data, the dynamic metadata is stored (518) and the UI element is generated (520). For example, the dynamic metadata is stored in the metadata cache (e.g., in JSON format). The MX UI generator processes the dynamic metadata to provide the UI element, as described herein. For example, the MX UI generator generates the UI element (page) for the specific type of device by making a call to a system API to do a platform specific check to get the runtime environment version, device form factors, and the like. The MX UI generator makes a call to a respective UI API of the runtime environment to render the control on different runtime environments to get the native user interface and experience. The UI element is rendered on the device of the user.

Figure 6:
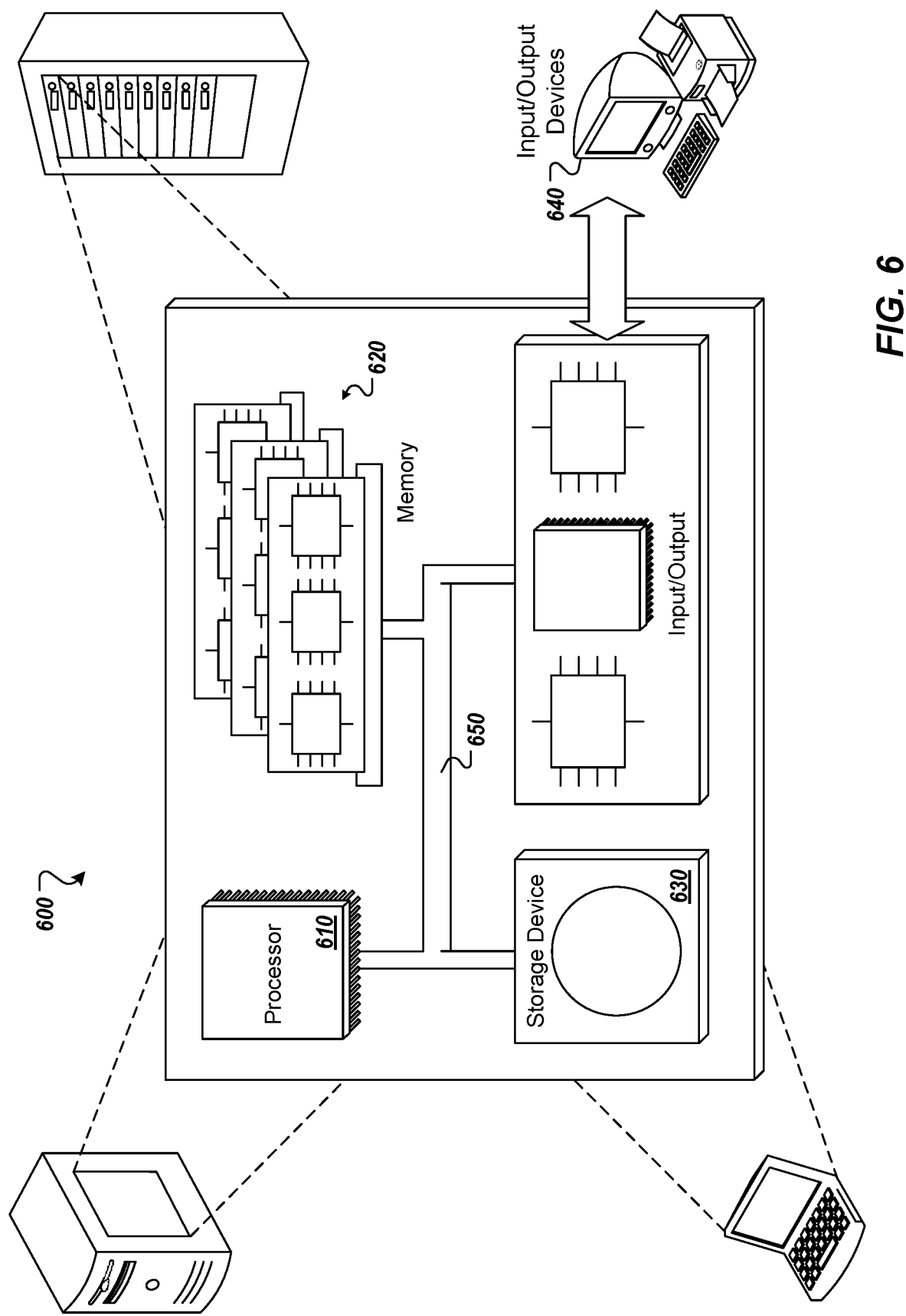
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for provisioning of a user interface (UI) element for an application during runtime of the application, the method being executed by one or more processors and comprising:
   providing, during a runtime of the application, a set of UI elements for the application from static metadata that is generated during a design-time of the application;
   enabling interaction of a user through one or more UI elements in the set of UI elements to execute one or more tasks using the application;
   receiving, by the application, input from the user of the application after execution of the one or more tasks, the input indicating that a UI element is to be generated for the user, the UI element being absent from the set of UI elements; and
   in response to the input:
      receiving, by a metadata generator and from a context data cache, context data representative of a context of the application when the input is received, the context data at least partially comprising a data schema definition of data accessed by the application and representing at least one of the one or more tasks executed using the application prior to receiving the input;
      defining, by the metadata generator, dynamic metadata based on at least a portion of the input, and at least a portion of the context data, the dynamic metadata comprising one or more actions that can be executed on data accessed through the UI element; and
      processing, by a UI generator, the dynamic metadata to generate the UI element for display in the application at least partially by determining a set of control definitions for a set of controls based on the dynamic metadata, each control representing an action of the one or more actions, and calling an operating system application programming interface (API) to render controls in the UI element.

2. The method of claim 1, wherein the input indicates a type of the UI element.

3. The method of claim 1, further comprising receiving additional input from the user that indicates at least one action of the one or more actions.

4. The method of claim 1, wherein the application comprises a chat bot that functions as a channel for receiving the input from the user and for prompting the user for additional input.

5. The method of claim 1, wherein the input is processed using one or more natural language processing (NLP) techniques to determine metadata that is to be included in the dynamic metadata.

6. The method of claim 1, wherein the one or more actions comprise a sort action, a filter action, a navigation action, and a search action.

7. The method of claim 1, wherein the UI element comprises one or more of a list page, an object page, and an analytics page.

8. A non-transitory computer-readable storage medium coupled to one or more processors and having instructions stored thereon which, when executed by the one or more processors, cause the one or more processors to perform operations for provisioning of a user interface (UI) element for an application during run-time of the application, the operations comprising:
 providing, during a runtime of the application, a set of UI elements for the application from static metadata that is generated during a design-time of the application;
 enabling interaction of a user through one or more UI elements in the set of UI elements to execute one or more tasks using the application;
 receiving, by the application, input from the user of the application after execution of the one or more tasks, the input indicating that a UI element is to be generated for the user, the UI element being absent from the set of UI elements; and
 in response to the input:
  receiving, by a metadata generator and from a context data cache, context data representative of a context of the application when the input is received, the context data at least partially comprising a data schema definition of data accessed by the application to and representing at least one of the one or more tasks executed using the application prior to receiving the input;
  defining, by the metadata generator, dynamic metadata based on at least a portion of the input, and at least a portion of the context data, the dynamic metadata comprising one or more actions that can be executed on data accessed through the UI element; and
  processing, by a UI generator, the dynamic metadata to generate the UI element for display in the application at least partially by determining a set of control definitions for a set of controls based on the dynamic metadata, each control representing an action of the one or more actions, and calling an operating system application programming interface (API) to render controls in the UI element.

9. The non-transitory computer-readable storage medium of claim 8, wherein the input indicates a type of the UI element.

10. The non-transitory computer-readable storage medium of claim 8, wherein operations further comprise receiving additional input from the user that indicates at least one action of the one or more actions.

11. The non-transitory computer-readable storage medium of claim 8, wherein the application comprises a chat bot that functions as a channel for receiving the input from the user and for prompting the user for additional input.

12. The non-transitory computer-readable storage medium of claim 8, wherein the input is processed using one or more natural language processing (NLP) techniques to determine metadata that is to be included in the dynamic metadata.

13. The non-transitory computer-readable storage medium of claim 8, wherein the one or more actions comprise a sort action, a filter action, a navigation action, and a search action.

14. The non-transitory computer-readable storage medium of claim 8, wherein the UI element comprises one or more of a list page, an object page, and an analytics page.

15. A system, comprising:
 a computing device; and
 a computer-readable storage device coupled to the computing device and having instructions stored thereon which, when executed by the computing device, cause the computing device to perform operations for natural language explanations for provisioning of a user interface (UI) element for an application during run-time of the application, the operations comprising:
  providing, during a runtime of the application, a set of UI elements for the application from static metadata that is generated during a design-time of the application;
  enabling interaction of a user through one or more UI elements in the set of UI elements to execute one or more tasks using the application;
  receiving, by the application, input from the user of the application after execution of the one or more tasks, the input indicating that a UI element is to be generated for the user, the UI element being absent from the set of UI elements; and
  in response to the input:
   receiving, by a metadata generator and from a context data cache, context data representative of a context of the application when the input is received, the context data at least partially comprising a data schema definition of data accessed by the application and representing at least one of the one or more tasks executed using the application prior to receiving the input;
   defining, by the metadata generator, dynamic metadata based on at least a portion of the input, and at least a portion of the context data, the dynamic metadata comprising one or more actions that can be executed on data accessed through the UI element; and
   processing, by a UI generator, the dynamic metadata to generate the UI element for display in the application at least partially by determining a set of control definitions for a set of controls based on the dynamic metadata, each control representing an action of the one or more actions, and calling an operating system application programming interface (API) to render controls in the UI element.

16. The system of claim 15, wherein the initial input indicates a type of the UI element.

17. The system of claim 15, wherein operations further comprise receiving additional input from the user that indicates at least one action of the one or more actions.

18. The system of claim 15, wherein the application comprises a chat bot that functions as a channel for receiving the input from the user and for prompting the user for additional input.

19. The system of claim 15, wherein the input is processed using one or more natural language processing (NLP) techniques to determine metadata that is to be included in the dynamic metadata.

20. The system of claim 15, wherein the one or more actions comprise a sort action, a filter action, a navigation action, and a search action.

\* \* \* \* \*